United States Patent

Cobb et al.

[11] Patent Number: 5,167,507
[45] Date of Patent: Dec. 1, 1992

[54] TEACHING CLOCK HAVING INDICIA CARRIER ALLOWING CURVILINEAR TRANSLATION OF INDICIA

[75] Inventors: Nicola J. Cobb; David J. Cragie, both of Oadby, Great Britain

[73] Assignee: Invicta Plastics Ltd.

[21] Appl. No.: 698,088

[22] Filed: May 10, 1991

[30] Foreign Application Priority Data

May 11, 1990 [GB] United Kingdom ................ 9010605

[51] Int. Cl.$^5$ ............................................. G09B 19/12
[52] U.S. Cl. .................................................. 434/304
[58] Field of Search ............... 434/304, 198, 191, 206, 434/394, 402, 405, 199; 446/151, 152; 40/445, 446, 491, 488, 508, 509

[56] References Cited

U.S. PATENT DOCUMENTS

| 1,024,195 | 4/1912 | Göthberg | 434/404 |
| 2,705,387 | 4/1955 | Handler et al. | 446/151 |
| 3,364,599 | 1/1968 | Polsky | 434/304 |
| 3,967,389 | 7/1976 | Brooks | 434/304 |

Primary Examiner—Gene Mancene
Assistant Examiner—Jeffrey A. Smith
Attorney, Agent, or Firm—Longacre & White

[57] ABSTRACT

The invention relates to an eductional aid for teaching children to tell the time. The aid includes a face and at least one pointer rotatable about a centrally disposed axis relative to the face. A carrier is provided which carries indicia which are position behind the face. The face includes apertures through which at least some of the indicia can be seen. A knob for moving said carrier is also provided so that the indicia may be selectively displayed through the apertures.

11 Claims, 3 Drawing Sheets

TEACHING CLOCK HAVING INDICIA CARRIER ALLOWING CURVILINEAR TRANSLATION OF INDICIA

FIELD OF THE INVENTION

This invention relates to an educational aid primarily devised for teaching persons to tell the time. The instant invention provides a clock for which the numerals designating each hour may be selectively changed. Such a teaching device exposes students to variation in display numerals.

1. Description of Related Art

It is known to provide an imitation clock in which manually movable hands are used to point to the convention dial figures. However, real clocks have variations in the type of figures on the dial, for example using arabic or roman numerals.

2. Summary of the Invention

It is an object of the invention to provide new or improved educational aid simulating a clock.

According to the invention there is provided an educational aid comprising a face, at least one pointer rotatable about a centrally disposed axis relative to the face; carrier means carrying indicia and disposed behind the face; aperture means in the face through which at least some of said indicia can be seen; and carrier moving means adapted to move said carrier so as to display said indicia selectively in said aperture means.

The carrier means may comprise a plate disposed behind, and generally parallel to the face.

The plate may be rotatable. However, in a preferred embodiment, the plate is adapted to move in a gyratory manner.

One or more cam and follower connections may be provided between the face and the plate.

The carrier moving means may include driver means adapted to be manually operated. Detent means may be associated with the driver means to non-positively retain the carrier means in selected positions so as to display the selected indicia through said aperture means.

BRIEF DESCRIPTION OF THE DRAWINGS

An embodiment of the invention will now be described in more detail by way of example only with reference to the accompanying drawings in which.

DESCRIPTION OF THE PREFERRED EMBODIMENT

Figure 1:
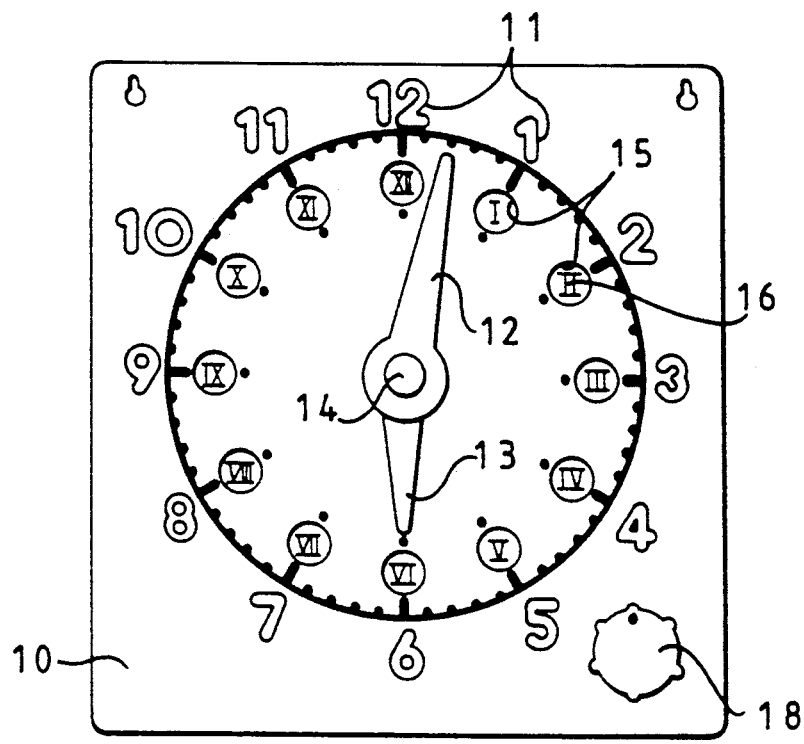
FIG. 1 is a front elevational view of an educational aid

Referring firstly to FIG. 1 of the drawings, there is shown an educational aid comprising a face 10 simulating a clock face and having fixed clock indicia 11 of generally conventional type. A pair of hands 12, 13, are pivoted at a central pivotable axis 14 so as to be movable around the face. The hands may be manually movable or may be operated by clockwork or electrical means.

In addition to the fixed indicia 11 the face has a plurality of aperture means 15 through which respective indicia 16 may be viewed.

Figure 2:
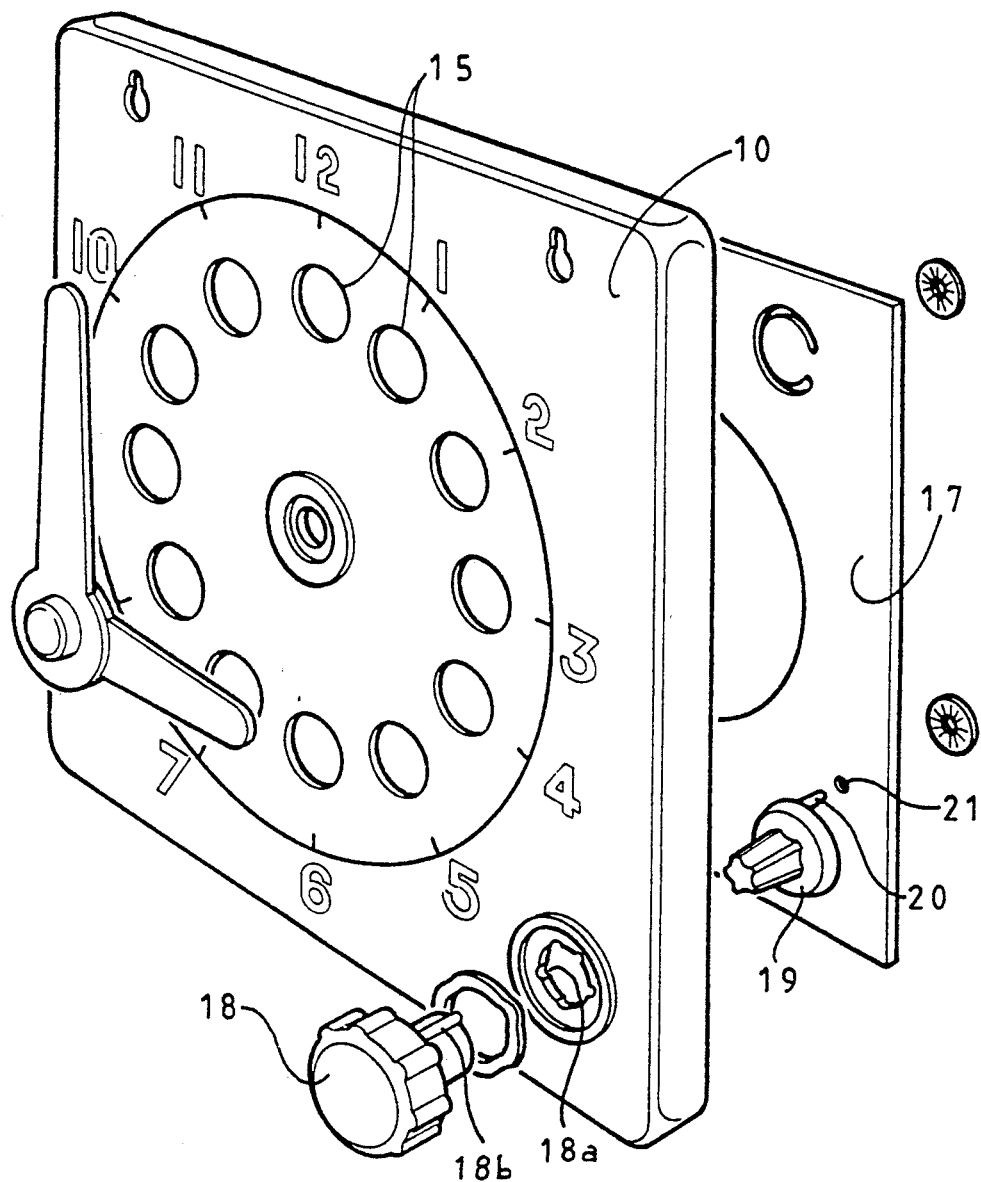
FIG. 2 is an exploded perspective view of the educational aid of FIG. 1
Figure 4:
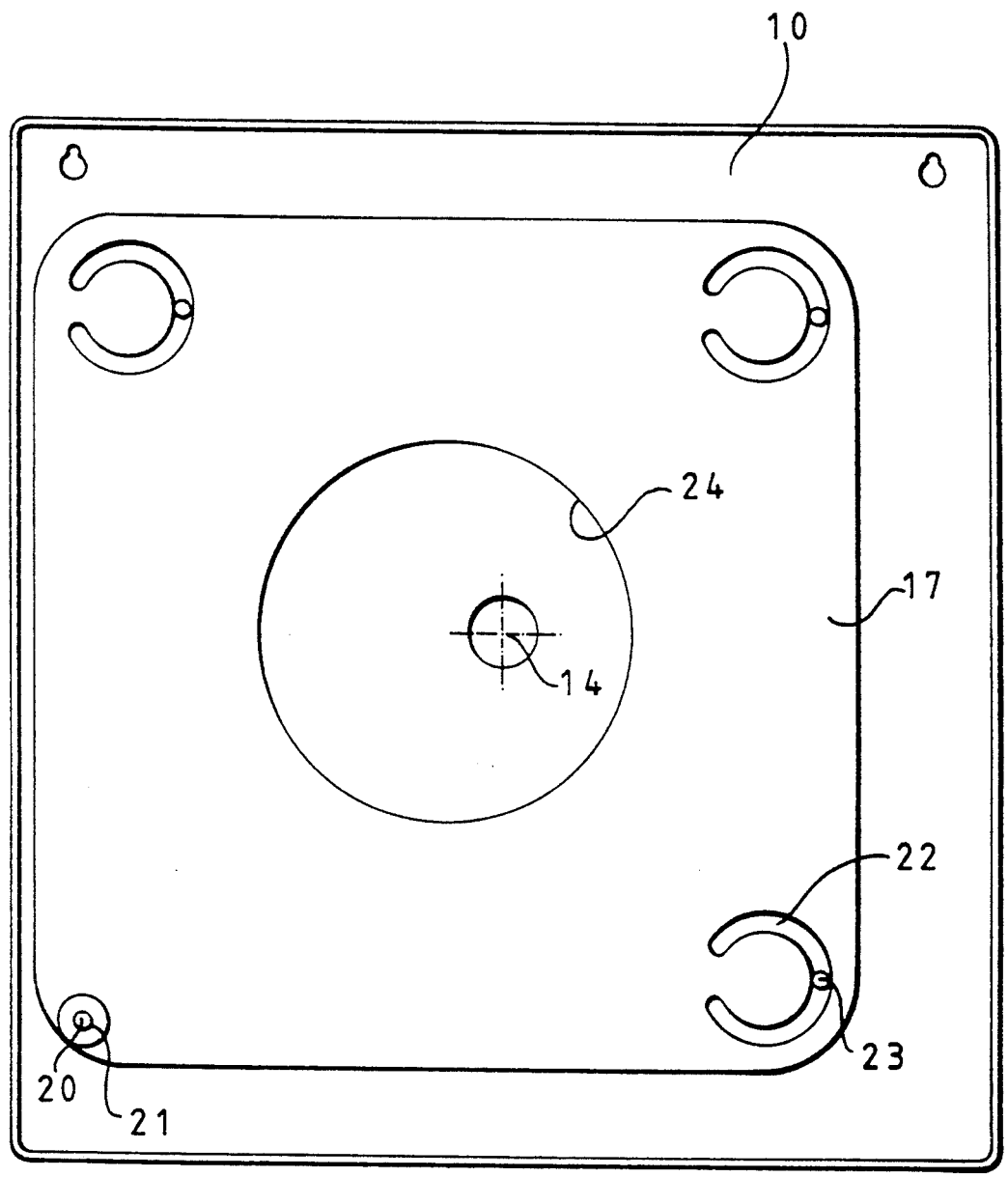
FIG. 4 is a rear elevational view of the educational aid.

The indicia 16 are provided on a carrier 17 best seen in FIG. 2 and FIG. 4 of the drawings. The carrier 17 is secured behind the face 10 and carries groups of indicias 16 which can selectively be viewed through the aperture means 15 in the face 10.

The carrier 17 is arranged to move relative to the face 10 under the control of a manual knob 18 passing through the face 10 and operating via a driver 19 comprising a disc having a peg 20 engaging a hole 21 of the carrier.

The carrier 17 is mounted behind the face 10 in a manner such as to permit it to move relative to the face 10 in a defined gyratory path. The peg and hole engagement 20, 21 can be seen in FIG. 4 of the drawings and it will also be seen that the carrier 17 has a number of generally C-shaped cam slots 22, each cooperating with a respective peg 23 fixed on the rear of the face plate 10. Rotation of the driver knob 18 causes movement of the carrier 17 to take place relative to the face 10. The movement is gyratory and is controlled by the cam and peg engagement 22, 23. A central opening 24 in the carrier acts as a clearance for the central pivot 14 of the hands.

Figure 3:
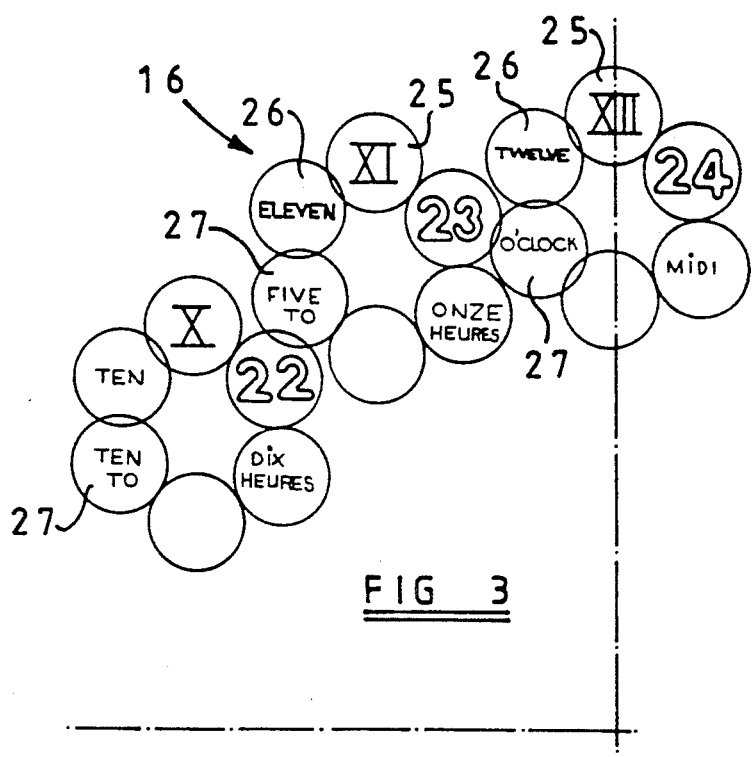
FIG. 3 is a layout of indicia on a portion of a carrier

Indicia are marked on the carrier in a pattern such that, at each of a number of pre-selected positions of the carrier, one set of indicia is visible through the aperture means 15. Considering FIG. 3 of the drawings, three sets of indicia are illustrated, each set comprising indicia of different types grouped in the generally circular pattern. At each pre-selected position of the carrier 17, indicia of one type are displayed through the aperture means 15. For example, the upper most indicia of the groups are Roman numerals, designated at 25 in the drawing. Adjacent each of the Roman numerals, at 26, is a written number. The indicia 27 indicate "five to" the hour, "ten to" the hour and so on. Other indicia can be used such as those giving French language versions of the hours or blank spaces which can be filled in by a child through the aperture means 15 in accordance with appropriate teaching.

The educational aid permits more interesting and wide ranging teaching concerning the use of clocks, time concepts and concepts of language and number not obtainable by the use of a standard clock face with movable hands.

The manual driver knob 18 can be provided with detent means in the form of, for example, notches 18a at the hole through which the knob 18 passes and into which a projection 18b on the knob can be located. This will enable the clear selection of one of the sets of indicia in the aperture means. However, this feature is optional.

We claim:

1. A teaching clock comprising a face, at least one pointer rotatable about a centrally disposed axis relative to the face; carrier means carrying a plurality of sets of indicia and disposed behind the face; aperture means in the face through which at least some of said indicia can be seen; and carrier moving means adapted to move said each of said plurality of sets of indicia about respective axes, said respective axes being displaced from said centrally disposed axis so as to display said indicia selectively in said aperture means.

2. A teaching clock as set forth in claim 1 wherein said carrier means comprises a plate disposed behind, and generally parallel to the face.

3. A teaching clock as set forth in claim 1 wherein at least one cam and follower connection is provided between the face and the plate, said cam and follower connection adapted to define the position of said respective axes.

4. A teaching clock as set forth in claim 1 wherein said carrier moving means includes driver means adapted to be manually operated, detent means associated with the driver means to retain the carrier means in selected positions so as to display the selected indicia through said aperture means.

5. A teaching clock comprising:
   a face,
   at least one pointer rotatable about a centrally disposed axis relative to said face,
   carrier means disposed behind the face and carrying indicia,
   aperture means in the face through which at least some of said indicia can be seen;
   wherein said carrier means is adapted for curvilinear translation so as to display said indicia selectively in said aperture means.

6. A teaching clock according to claim 5 wherein a carrier moving means is adapted to move said carrier means.

7. A teaching clock according to claim 6 wherein said carrier means comprises a plate disposed behind, and generally parallel to the face.

8. A teaching clock according to claim 7 wherein at least one cam and follower connection is provided between the face and the plate, said cam and follower connection defining said curvilinear translation.

9. A teaching clock comprising:
   a face,
   at least one pointer rotatable about a centrally disposed axis relative to the face,
   a carrier plate carrying indicia and disposed behind the face,
   an aperture means in said face through which at least some of said indicia can be seen,
   a plurality of cam slots formed in said carrier plate into which respective pegs, fixed to the rear of said face, are received, and
   driver means comprising a driver knob mounted on said face and engageable with a rotatable driver mounted on said carrier plate, said rotatable driver including a driver peg received in an aperture in said carrier plate so that as said driver knob is displaced, the carrier plate moves in a gyratory manner determined by the profile of the cam slots.

10. A teaching clock as set forth in claim 9 wherein said plurality of cam slots are each generally C-shaped.

11. A teaching clock as set forth in claim 9 wherein said driver means is rotatable to move the carrier plate between selected positions so as to display the selected indicia through said aperture means.

* * * * *